No. 628,476. Patented July 11, 1899.
J. H. KIRK & J. W. JEFFS.
JUNCTION OF CYCLE, MOTOR CAR, OR OTHER FRAMES, &c.
(Application filed Mar. 18, 1898.)
(No Model.)

Witnesses:
J. B. Bolton

Inventors:
Joseph Howard Kirk
John William Jeffs
By Richards & Co
their Attorneys

UNITED STATES PATENT OFFICE.

JOSEPH HOWARD KIRK AND JOHN WILLIAM JEFFS, OF BIRMINGHAM, ENGLAND.

JUNCTION OF CYCLE, MOTOR-CAR, OR OTHER FRAMES, &c.

SPECIFICATION forming part of Letters Patent No. 628,476, dated July 11, 1899.

Application filed March 18, 1898. Serial No. 674,375. (No model.)

*To all whom it may concern:*

Be it known that we, JOSEPH HOWARD KIRK, manager, of Jessamine Villa, Orchard road, Erdington, Birmingham, and JOHN WILLIAM JEFFS, manager, 56 Cyril road, Small Heath, Birmingham, in the county of Warwick, England, subjects of the Queen of Great Britain, have invented certain new and useful Improvements in the Junctions of Cycle, Motor-Car, or other Frames Applicable also to Analogous Purposes; and we do hereby declare the following to be a full, clear, and exact description of the invention, such as will enable others skilled in the art to which it appertains to make and use the same.

Our invention has for its object improvements in the junctions of cycle, motor-car, and other frames, applicable also to analogous purposes—such, for instance, as hand-rails, bridges, &c.—which enables us to make junctions without the use of brazing or soldering, which necessitates a certain amount of heat being applied to the parts to be united, thus rendering such parts liable to overheating, which is found to injure such junctions.

In order that our invention may be more clearly understood and easily carried into practical effect, we have appended hereunto two sheets of drawings, upon which we have illustrated sufficient examples of our improved joint to show its application.

Figure 1:
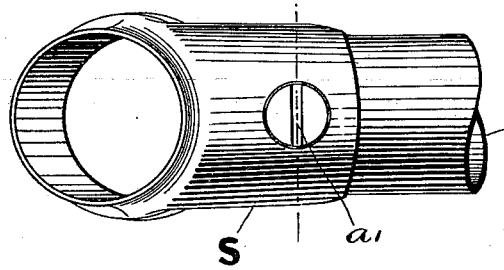
Figure 4:
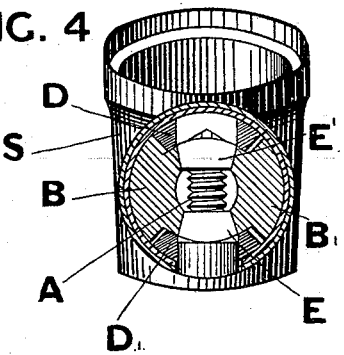
Figure 7:
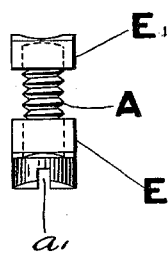
Figure 5:
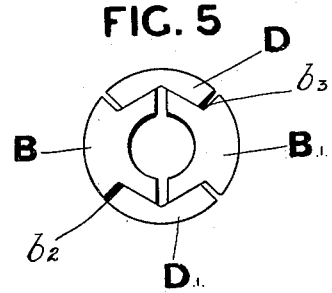
Figure 8:
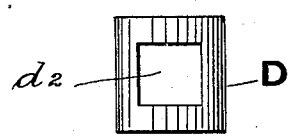
Figure 10:
Figure 6:
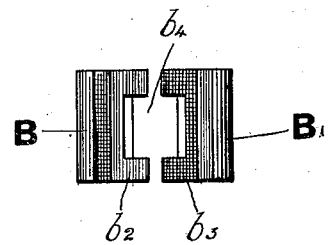
Figure 9:
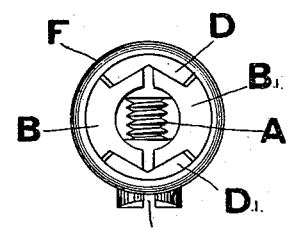
Figure 2:
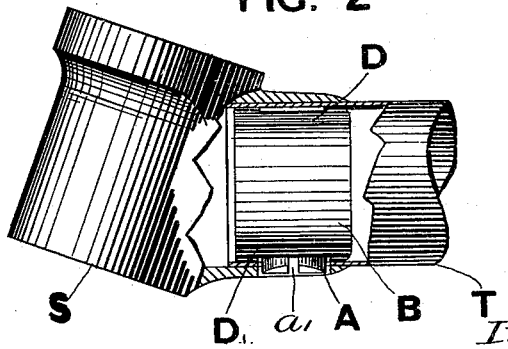
Figure 3:
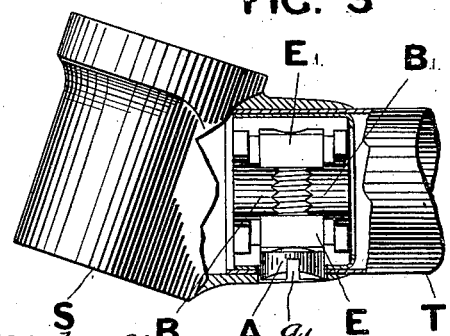

Figure 1 is an under side view showing the tube T connected to the socket S according to our invention. Fig. 2 is an elevation of Fig. 1 with a portion of the socket and the tube broken away. Fig. 3 is a similar view to Fig. 2, showing one of the drums or blocks removed. Fig. 4 is an end view of the socket and tube. Fig. 5 is an end view of the drums or blocks and other parts ready for inserting into the end of the tube. Fig. 6 is a plan view of Fig. 5 with the blocks D and D' removed. Fig. 7 shows the pin and wedge or cones. Fig. 8 is a plan view of the block D. Fig. 9 is an end view showing the parts held together by an outer sleeve or ferrule of soft metal. Fig. 10 is an end view of block B.

In carrying our invention into practice we bore the lug or socket S and turn the end of the tube T or spigot when necessary, so as to be a fairly accurate fit. We then bore a hole through the socket and through the tube, so as to allow the screw-pin A to pass through. We now form the four segmental blocks B and B' and D and D'. The blocks B are B' are preferably drawn in the bar, as shown at Fig. 10, and then cut off to the required lengths, which leaves them in a nearly-finished state, or these blocks may be formed by stamping, pressing, casting, turning, or the like, the center portion being formed hollow for lightness, if necessary. The blocks D and D' are fitted onto the inclined planes $b^2$ and $b^3$ of the blocks B and B', and when the blocks B B' are slightly expanded they form the complete circle, as clearly shown at Figs. 4 and 5. Between the parts B and B' we form the holes $b^4$, which are tapered at each end toward the center to receive the tapered nuts E and E'. These tapered nuts have a hole drilled in the center, the hole in the nut E being sufficiently large so as to allow the screwed pin A to pass freely through; but the hole in the nut E' is tapped with a screw-thread to correspond with the screw-pin. The blocks D and D' are also provided with the hole $d^2$, so as to allow the nuts to pass freely through. When the parts are placed in position in the tube and the whole placed in position in the socket or lug, so as to bring the holes in the tube and socket exactly over each other, the pin A is inserted and screwed up by inserting the end of a suitable tool in the slot $a'$, formed in the head of the screw-pin, the point of the screw-pin, which fits into the tapered nut E', will draw this nut inward, and the other tapered nut E will be forced inward also by the under side of the head of the pin, by which means the two semiblocks B and B' are opened out, which action at the same time causes the blocks D and D' to expand also, thereby strongly forcing the parts B and B' and D and D' against the inner surface of the tube, thus expanding or tightening it in the socket or lug and forming the junction without brazing. Instead of using tapered nuts we may use conical nuts, and in this case one nut may be formed solid with the pin. After the pin A has been screwed home, which is then flush or nearly flush with the surface of the lug, a spring cap or cover may be used for covering the end of the pin.

For the purpose of holding the parts together while they are placed in the tube and for storage purposes we fit them into the short piece of soft-metal tubing F, as shown at Fig. 9, and this tube may be placed with the parts into the end of the tube T when forming the junction, and when the semiblocks and parts D and D' are expanded this tube, being of a soft metal, will expand also, thus forming a kind of pad or cushion between the two hard surfaces. It will be evident that the semiblocks and the parts D and D' may when fitted together be of any form in cross-section— such, for instance, as oval, D shape, square, or octagonal—so as to enable the junctions to be made with tubing of a like shape or section.

What we claim, then, is—

1. In a junction for the tubes of cycles and like frames, the combination of the tube ends fitting one within the other, the main blocks having oppositely-inclined faces, the supplemental blocks having correspondingly-inclined faces resting upon the inclined faces of the main blocks and adapted to be forced outward by the separation of said main blocks, the wedge members located between the main blocks, and the screw-bolt for operating said wedge members, substantially as described.

2. In a junction for the tubes of cycles and like frames, the combination with the tube ends fitting one within the other, of the two main blocks having each two oppositely-inclined faces with a rounded portion between, a pair of supplemental blocks having each corresponding inclines and a rounded face adapted to form a continuation of the curve of the main blocks, transversely-arranged wedge members located between the main blocks, and a screw-bolt for operating said wedge members, substantially as described.

In testimony whereof we affix our signatures in the presence of two witnesses.

JOSEPH HOWARD KIRK.
JOHN WILLIAM JEFFS.

Witnesses:
  THOMAS MARSTON,
  GEORGE LESTER.